June 15, 1965 M. C. HENDRICKSON ETAL 3,189,875

PULSE AMPLITUDE TO PULSE SEQUENCE CONVERSION APPARATUS

Filed July 23, 1959 3 Sheets-Sheet 1

INVENTORS

Melvin C. Hendrickson

Richard C. Herrmann

By James E. Tracy

Atty.

PULSE AMPLITUDE TO PULSE SEQUENCE CONVERSION APPARATUS

Filed July 23, 1959 3 Sheets-Sheet 2

INVENTORS
Melvin C. Hendrickson
Richard C. Herrmann
By James E. Tracy
Atty.

June 15, 1965 M. C. HENDRICKSON ETAL 3,189,875

PULSE AMPLITUDE TO PULSE SEQUENCE CONVERSION APPARATUS

Filed July 23, 1959 3 Sheets-Sheet 3

INVENTORS
Melvin C. Hendrickson
Richard C. Herrmann
By James E. Tracy
Atty.

3,189,875

PULSE AMPLITUDE TO PULSE SEQUENCE CONVERSION APPARATUS

Melvin C. Hendrickson, Elmhurst, and Richard C. Herrmann, Chicago, Ill., assignors to Zenith Radio Corporation, a corporation of Delaware Filed July 23, 1959, Ser. No. 829,104
8 Claims. (Cl. 340—167)

This invention relates in general to a novel detecting apparatus which finds utility in a variety of different fields. The invention has particular application to a distortion problem which may be encountered in a subscription television system and will be described in that environment.

Accordingly, it is an object of the present invention to provide a new and improved detecting apparatus.

An apparatus, constructed in accordance with the invention, comprises means for simultaneously developing several different control signals each of which has a unique, unknown amplitude. Means are coupled to the developing means for selecting the one of the different control signals having an amplitude closest to a predetermined reference magnitude. Finally, the detecting apparatus includes means coupled to the selecting means for providing information indicating the selected control signal.

Secrecy communication systems, such as subscription television systems, have been proposed in which an intelligence signal, for example an audio signal, is coded by altering some characteristic thereof, such as phase, at spaced time intervals determined by a coding schedule made known only to authorized receivers. Most such systems do effect adequate coding or scrambling of the intelligence signal but the signal, as coded, may have a D.C. component in addition to an A.C. component, resulting from the fact that the phase inversions occur at different points in the signal cycles. Most transmitters of conventional design are not capable of transmitting a D.C. component so that only the A.C. portion of the coded intelligence signal is radiated. When the A.C. component alone is applied to the decoding apparatus of each receiver and the output therefrom is utilized to operate a sound reproducer, distortion results. Such distortion is inevitable unless the decoder operates upon the same signal as that produced by the coder at the transmitter, and the necessary identity of signals is not obtainable when the transmitter radiates less than all components of the coded intelligence signal. This identity may also be destroyed in the receiver if the coupling networks do not translate the low-frequency components of the received signal.

Of course, it is theoretically possible to employ a perfect, carefully designed, D.C. modulator in a transmitter, such as in a frequency modulated audio transmitter, that has a high degree of stability. Moreover, a perfect frequency detector may be used at the receiver to reproduce the D.C. component. If the circuits employed are not absolutely stable in operation, however, objectionable frequency drift results. As a consequence, it is impractical to transmit and reproduce a D.C. component of a coded intelligence signal in this manner.

One arrangement for overcoming this distortion problem is disclosed in copending application Serial No. 829,103, filed concurrently herewith, and issued January 15, 1963, as Patent 3,073,892, in the name of Walter S. Druz, and assigned to the present assignee. Patent 3,073,892, Druz, teaches the basic concept of "programming" each portion of the code schedule prior to the transmission of a corresponding portion of audio information in such a manner that phase inversion of the audio signal occurs at times calculated to result in a D.C. component in the coded audio signal which is as small as possible and thus of negligible effect, so that it is not necessary to provide for the transmission of the D.C. component. The Druz patent explains in considerable detail that when an intelligence signal, such as an audio signal, is phase inverted at an instant or point in a cycle when the amplitude level is not close to or at a peak, distortion results. Such distortion gives rise to an objectionable "ping" in the reproduced audio and is attributable to the fact that a D.C. component, which is developed by the phase inverting coding process, of the coded audio has not been successfully translated and employed in the receiver decoder in reconstituting the intelligence in uncoded form. An arrangement is described in the concurrently filed Druz application which effectively determines the required phase of a coding signal to achieve phase inversions of the audio when it is passing through its peaks, or at least very close to the peaks, in order that negligible ping distortion is generated. The desired phase condition may be considered an operating state selected from several possible operating states. Copending application Serial No. 829,106, filed concurrently herewith, in the name of Herrmann et al., issued January 15, 1963, as Patent 3,073,893, and assigned to the present assignee, describes a code generator which may be used in conjunction with the Druz minimum-ping selector in order to develop a coded signal which represents the selected operating state.

More specifically, Patent 3,073,893 discloses in detail a code generator for developing a coded signal which may be used to produce a coding signal having a waveshape representing a code schedule which will result in a scrambled audio signal containing a minimum D.C. or ping component. An embodiment of the detecting apparatus of the present invention is incorporated in the code generator of Patent 3,073,893. Accordingly, reference may be made thereto for a more complete explanation of one typical use to which the present invention may be applied.

The features of this invention which are believed to be new are set forth with particularity in the appended claims. The invention, together with further objects and advantages thereof, may best be understood, however, by reference to the following description in conjunction with the accompanying drawings, in which:

Figure 1:
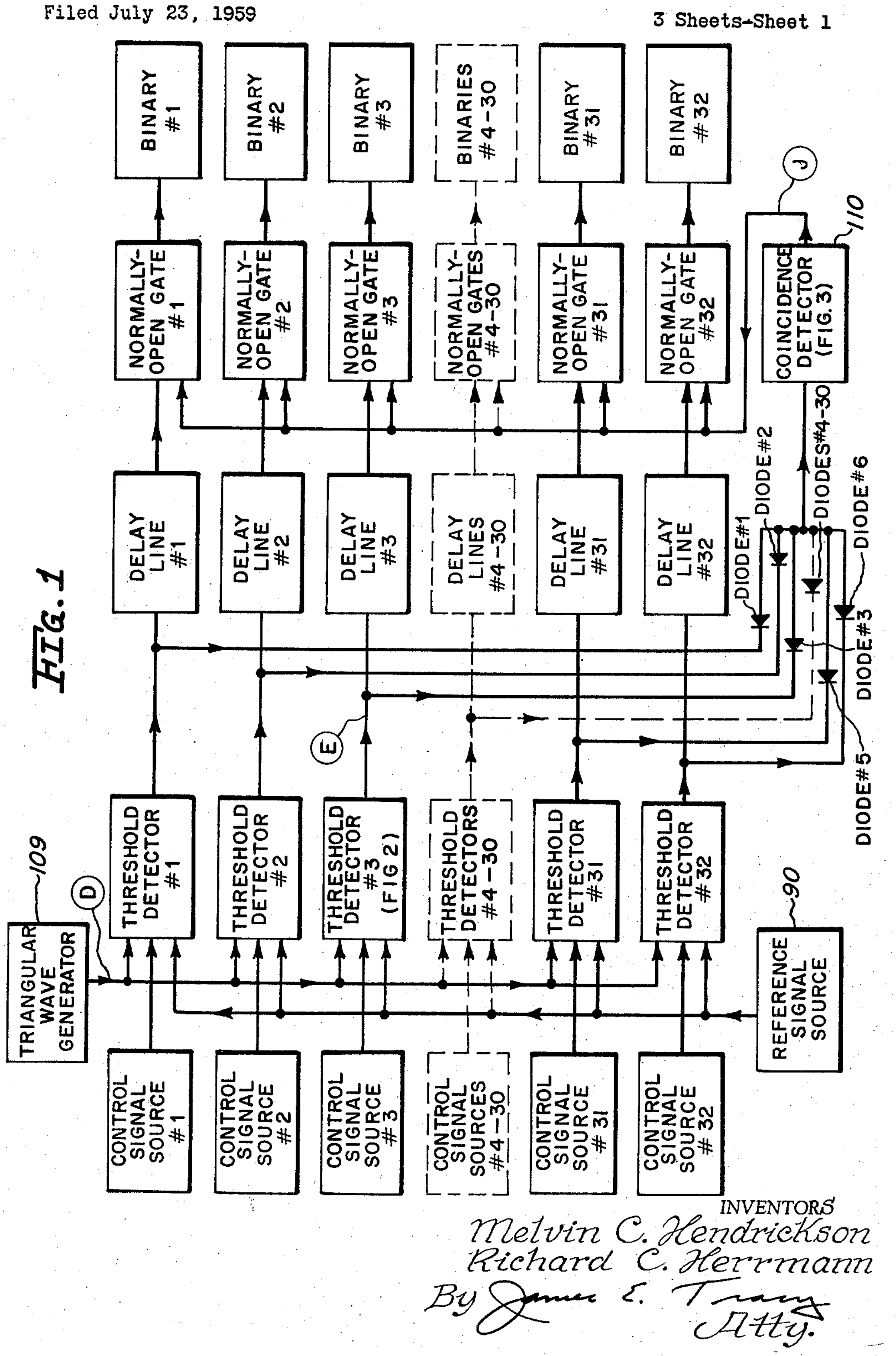
FIGURE 1 illustrates in block diagram form the portion of the code generator of Patent 3,073,893 which includes the detecting apparatus of the present invention.

Turning now to a structural description of the arrangement of FIGURE 1, the code generator comprises a series of thirty-two similarly constructed control signal sources #1–#32. Only sources #1–#3, #31 and #32 are shown by individual blocks in solid line construction. The remaining control signal sources #4–#30 have been collectively represented by a single block in dashed construction. This has been done for the obvious reason of making the drawing considerably less cumbersome. It will be noted that this expedient of grouping several circuits into dashed blocks is employed throughout FIGURE 1 for the sake of simplicity.

The construction of each of control signal sources #1–#32 is illustrated and described in complete detail in Patent 3,073,893, Herrmann et al. Briefly, each control signal source includes a phase-inversion type audio coder to which is applied an audio signal, representing the sound intelligence accompanying a television program, and also a coding signal having a waveshape representing a predetermined code schedule. More specifically, the coding signal is of square waveshape with amplitude excursions every sixteen line-trace intervals. The timing of the excursions reflects the code schedule of the coding signal. The audio signal is phase inverted in response to each amplitude excursion.

Thirty-two different coding signals, each representing a different code schedule, are respectively applied to the thirty-two coders. In this way, thirty-two coded audio signals are simultaneously developed, each of which is coded in accordance with a different code schedule. Since the particular amplitude and polarity of the D.C. component in the coded audio, introduced in the coding function, is determined by the code schedule employed, each of the thirty-two coded audio signals will contain a D.C. component having a different predetermined magnitude and polarity.

Each of the control signal sources #1–#32 contains an integrator to develop, from the coded audio, a control signal in the form of a voltage which corresponds or is proportional to the D.C. component of the coded audio signal. Each integrator may include merely a series-connected resistor and a shunt-connected storage condenser. The output of each of the control signal sources #1–#32 is derived from the integrator. Hence, sources #1–#32 simultaneously produce thirty-two different control signals each of which has a unique amplitude-polarity condition.

The output terminals of control signal sources #1–#32 are connected to one pair of input terminals of a series of threshold detectors #1–#32, respectively. The output terminals of a triangular wave generator 109, whose make-up is also fully explained in Patent 3,073,893, are connected in common to separate input circuits of each of threshold detectors #1–#32. Generator 109 produces a series of spaced, negative-going sawtooth shaped pulses. The output terminals of a reference signal source 90, fully illustrated and described in Patent 3,073,893, are connected in common to additional input circuits of each of threshold detectors #1–#32. Source 90 specifically provides a reference voltage of either polarity and of fixed amplitude.

Figure 2:
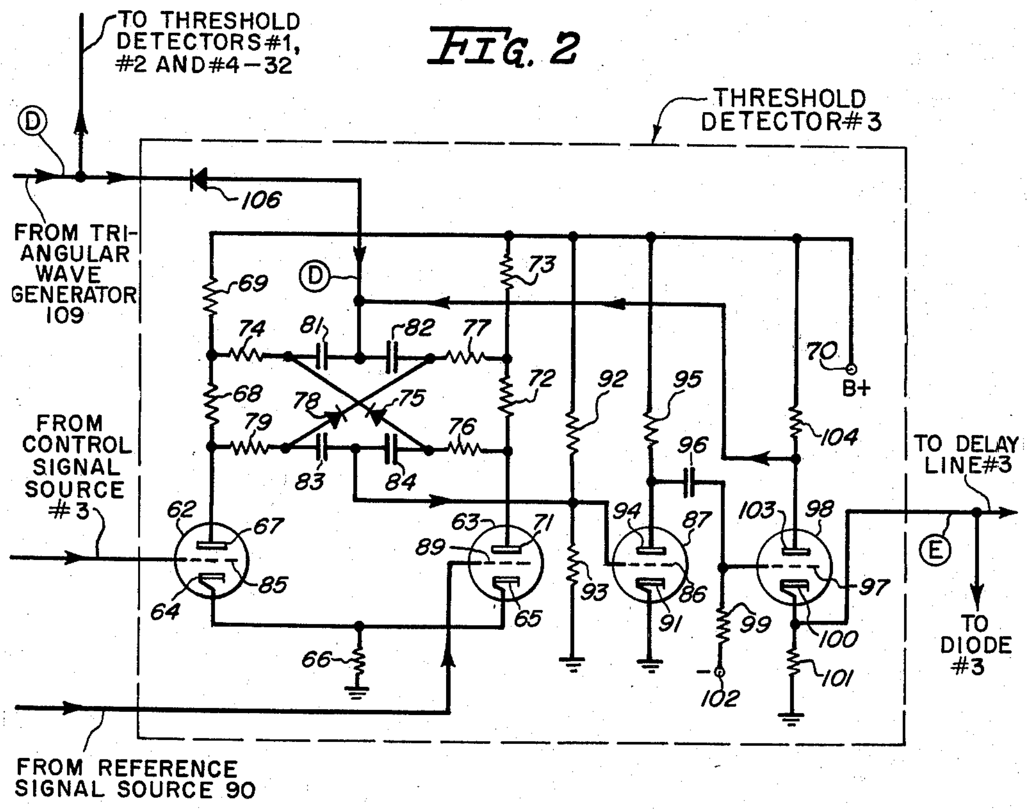
FIGURES 2 and 3 are more detailed schematic representations of some of the blocks of FIGURE 1; and, FIGURES 4 and 5 comprise various signal waveforms helpful in explaining the operation of the detecting apparatus.

Each of threshold detectors #1–#32, respective ones of which are connected to the inputs of respective ones of a series of delay lines #1–#32, is constructed in similar manner and thus only one is shown in detail, for example threshold detector #3, in FIGURE 2. Referring to that figure, a pair of triodes 62, 63 are effectively interconnected to form a class A operated push-pull amplifier. Specifically, cathode 64 of tube 62 and cathode 65 of triode 63 are connected together and through a cathode resistor 66 to a plane of reference potential, such as ground. Anode 67 is connected through a pair of series-connected resistors 68 and 69 to a source of B+ operating voltage 70, and anode 71 of tube 63 is also connected via a pair of series-connected resistors 72 and 73 to source 70.

The junction between resistors 68 and 69 is connected to anode 71 through a series connection comprising a resistor 74, a unidirectional device, such as a diode 75, and a resistor 76, the cathode of diode 75 being connected to resistor 74 and the anode to resistor 76. Similarly, the junction between resistors 72 and 73 is connected to anode 67 by means of a series circuit consisting of a resistor 77, a unidirectional device or diode 78 and a resistor 79, the cathode of diode 78 being connected to resistor 77 and the anode to resistor 79. The junction between resistor 74 and diode 75 is connected to the junction between resistor 77 and diode 78 by means of a pair of series-connected condensers 81, 82. In like manner, the junction between resistor 79 and diode 78 is coupled to the junction between diode 75 and resistor 76 via series-connected condensers 83 and 84. Since tubes 62 and 63 are operated as class A amplifiers, the resistance of resistors 68 and 72 is adjusted so that a voltage is normally impressed across each of diodes 78 and 75 sufficient to render them ordinarily cut off. Control grid 85 of triode 62 is connected to the output of control signal source #3, and the junction between condensers 83 and 84 is connected to the control grid 86 of a triode 87 which serves as a pulse amplifier. Grid 89 of triode 63 is connected to the output of reference signal source 90.

Cathode 91 of tube 87 is grounded and grid 86 is provided with a fixed positive bias with respect to cathode 91 by virtue of a voltage dividing arrangement comprising a pair of series-connected resistors 92 and 93 connected between source 70 of B+ operating voltage and ground, grid 86 being connected to the junction between the two resistors. The fixed bias is of such a magnitude to render tube 87 normally saturated. Anode 94 of triode 87 is connected to source 70 through a load resistor 95 and is also connected through a series-connected condenser 96 to the control grid 97 of a triode 98 which serves as a combination amplifier and phase inverter. Grid 97 is also connected to a source of negative bias potential 102 through a grid-leak return resistor 99 and cathode 100 is connected to ground through a resistor 101. Source 102 establishes grid 97 at a negative potential with respect to cathode 100 in order to render tube 98 normally cut off or non-conductive. Anode 103 of triode 98 is connected through a load resistor 104 to source 70 and cathode 100, which produces the output signal of the threshold detector, is connected to the input of delay line #3; the other circuit to which cathode 100 is connected will be described shortly.

The common output from triangular wave generator 109 is connected to the junction between condensers 81 and 82 by way of a diode 106, and anode 103 of triode 98 is directly connected to the junction between condensers 81 and 82.

Returning now to the schematic of FIGURE 1, each of delay lines #1–#32, which individually introduce a very slight time delay to an applied signal of the order of 1/16 of a line-trace interval, is connected to a respective one of a series of normally-open gate circuits #1–#32. The outputs of threshold detectors #1–#32 are also connected through a series of normally-conductive diodes #1–#32, respectively, to a common input circuit of a single coincidence detector 110, the common output of which is connected to separate input circuits of normally-open gates #1–#32.

Figure 3:
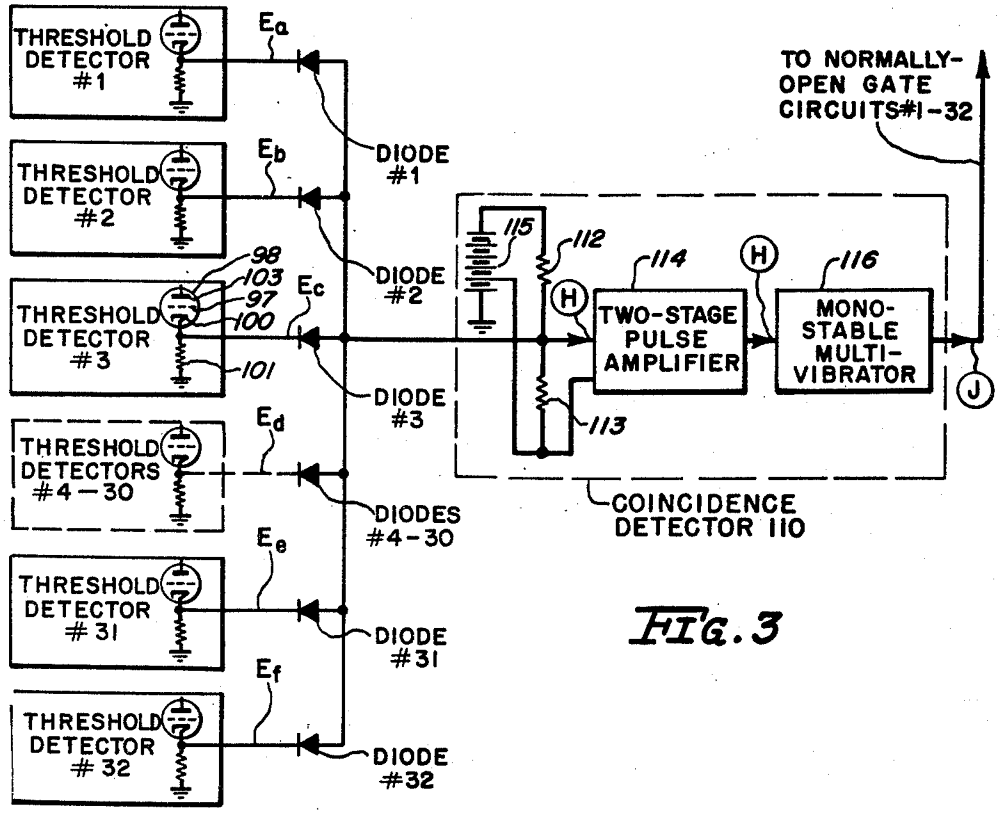

Coincidence detector 110 is shown in detail in FIGURE 3 along with diodes #1–#32 and portions of each of threshold detectors #1–#32. Cathode 100 of triode 98 of threshold detector #3 and the cathodes of the corresponding triodes 98 in all of the other threshold detectors, namely, #1, #2 and #4–#32, are connected through the correspondingly numbered diodes to the junction between a pair of series-connected resistors 112, 113 and also to one of two input terminals of a two stage pulse amplifier 114. Amplifier 114 includes a bias source (not shown) to provide a fixed bias in order to render it normally cut off. A unidirectional voltage source 115 is provided and its negative terminal is connected to ground and its most positive terminal is connected to the upper end of resistor 112, namely the end opposite to that which is connected to resistor 113. A point along voltage source 115, which provides a voltage positive with respect to ground but negative with respect to the voltage impressed on the top of resistor 112, is connected to the bottom of resistor 113, that is the end opposite to that which is joined to resistor 112. The bottom of resistor 113 is also connected to the other input terminal of amplifier 114. The output circuit of amplifier 114 is connected to a monostable multivibrator 116 which in turn is connected to the separate inputs of normally-open gate circuits #1–#32.

The outputs of normally-open gates #1–#32 (FIGURE 1) are connected to a series of binaries or bi-stable multivibrators #1–#32, respectively. Each of these binaries may be of conventional construction in that it has two stable operating conditions, designated for convenience as a reset condition and an offset condition, and is triggered to its offset condition only in response to pulses applied thereto from its associated one of gates #1–#32.

Consideration will now be given to an explanation of the operation of the invention with reference to various idealized signal wave forms of FIGURE 4. These curves appear at certain points in the detecting apparatus as indicated by the encircled letter designations which are correspondingly identified by the same letters in FIGURE 4.

As fully explained in Patent 3,073,893, thirty-two differently phased square wave shaped coding signals are respectively applied to the thirty-two audio coders in control signal source #1–#32 to produce thirty-two differently coded audio signals. Since the phases of the coding signals differ, the phase inversion of each of the thirty-two coded audio signals will take place at different instants, namely at different points in the audio signal cycles. Hence, each one of the coded audio signals contains a D.C. component of a different magnitude and polarity.

It will be recalled that the reason undesirable ping distortion is introduced is attributable to inverting the audio signal at times when the audio signal is close to or at a zero cross-over point. It will be appreciated that in a system where the square wave shaped coding signal utilized for timing the audio phase inversions may have any one of thirty-two different phase conditions, it would be most advantageous to actually select the phase condition which would give rise to a coded audio signal with the least D.C. component or ping distortion. In other words, phase inverting a given portion of the audio in accordance with a particular selected one of the thirty-two available square wave signals results in less ping distortion because in this manner the phase inversions may be made to occur primarily at instants when the audio signal is at or close to either a positive or negative amplitude peak.

Inasmuch as it is possible in the illustrated example to use any one of the thirty-two different coding signals for coding purposes, since each coding signal has a unique phase relationship with respect to the others, it may be said that the system has thirty-two possible operating states corresponding to the thirty-two phase conditions of the control signals. It will be shown that during each field-retrace interval a determination is made as to the particular one of the thirty-two possible operating states that gives rise to minimum or negligible ping distortion in the audio occurring during the immediately preceding field-trace interval. As completely explained in Patent 3,073,893, steps are then taken to develop a somewhat complicated but very secure code, namely a coded-encoding signal, during the succeeding field-retrace interval in order to place or establish the transmitter and all the various receivers in that operating state for the next succeeding field-trace interval. Since the transmitter and receivers are actually not established in the selected operating state until two full field-trace intervals subsequent to the occurrence of the audio from which the determination is made, a corresponding time delay of two field-trace intervals is introduced before the audio is coded in the transmitter. In this way, the system effectively anticipates the particular operating state rendering least ping distortion.

The manner in which a determination is made as to which one of the thirty-two coding signals will produce a coded audio signal of least or negligible ping distortion will now be explained.

The several differently coded audio signals are applied to respective ones of the thirty-two integrators respectively included in control signal sources #1–#32, each of which integrators develops a control potential which corresponds or is proportional to the D.C. component of the coded audio signal which it receives. The various control potentials are respectively developed in the outputs of control signal source #1–#32 and are applied, unaltered, to threshold detectors #1–#32. It will now be shown that the threshold detectors determine which of the several coded audio signals contains the common signal component, namely the D.C. component, having a magnitude sufficiently close to a predetermined reference magnitude, but of opposite polarity with respect thereto, to result in negligible ping distortion. It should be pointed out that during each field-trace interval the coded audio signal exhibiting a D.C. component of least amplitude does not necessarily indicate the most desired operating state in which all of the receivers should be established in decoding the same portion of audio information. This follows because the immediately preceding coded audio portion, which has been coded in accordance with a previous determination, may have exhibited a certain D.C. component, be it ever so small, which would have charged up the coupling networks at the receivers, providing a residual or "past history" charge. Such a charge is represented by the amplitude and polarity of the reference voltage developed in source 90 in a manner fully explained in Patent 3,073,893. The next determination should then take this previous D.C. component into account and the coded audio selected should be that which contains a D.C. component which, when combined with the previous D.C. component, results in a minimum or negligible D.C.

A computation is made during each field-retrace interval on the basis of the amplitude level and polarity of the D.C. included in the audio signal, occurring during the preceding field-trace interval, after it has been coded in accordance with each one of the thirty-two operating states (namely, in accordance with each of the thirty-two square waves) for the entire preceding field-trace interval. Once the computation is made, the following field-trace interval is devoted to the development of the code which is employed during the subsequent field-retrace interval to change the transmitter and receivers to the desired selected operating state, wherein they remain for the entire duration of the next succeeding field-trace interval. Thus, there is a two-field delay from the actual occurrence of each audio portion until the transmitter and receivers are placed in the operating state calculated to result in negligible ping distortion in the same portion. For this reason, and as mentioned hereinbefore, before the audio signal is actually coded in accordance with the selected operating state and transmitted to the receivers, it is delayed for two entire field-trace intervals.

In order to understand the manner in which the coded audio signal exhibiting the desired D.C. component is actually determined by threshold detectors #1–#32, attention is directed to FIGURE 2 which shows the details of threshold detector #3 and is of identical construction as the remaining threshold detectors. For purposes of illustration it will be assumed initially that no previous charge has been built up in the receivers (namely, no past history) and that during a given field-trace interval the audio signal has such frequency and amplitude characteristics that the coded audio signal developed in the coder included in control signal source #3 exhibits a D.C. component of negligible amplitude. Consequently, it would be desirable to code that portion of the audio signal in accordance with operating state three.

Turning now to FIGURE 2, the control potential developed in the output of control signal source #3, which is proportional to the D.C. component of the coded audio from the associated coder, is applied to control grid 85 of tube 62. Since triodes 62 and 63 are effectively cross-coupled by means of common cathode resistor 66 to form a push-pull amplifier, the control potential impressed on grid 85 is also applied to cathode 65 with the same polarity. This has the same effect as if the control potential were applied to grid 89 of tube 63 with opposite polarity. Thus, the D.C. component effectively is applied to tubes 62 and 63 in push-pull and the electron flow through load resistors 72 and 73 to source 70 is determined by the particular level of the control potential at any given instant, bearing in mind that past history is ignored at this time and thus no potential is applied to grid 89 from reference signal source 90.

Figure 4:
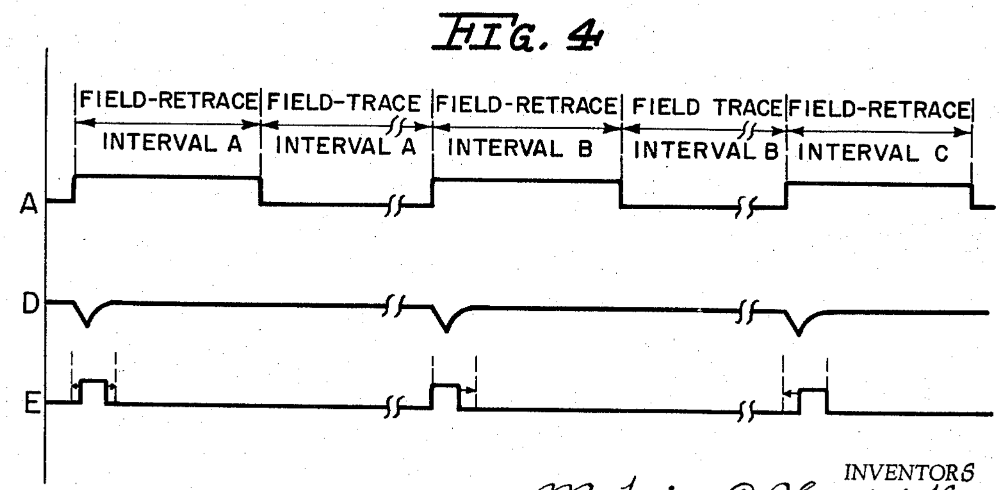

Referring to FIGURE 4, curve A depicts three successive field- or vertical-blanking pulses occurring respectively during field-retrace intervals designated A, B, and C. As described in Patent 3,073,893, triangular wave generator 109 produces the negative sloping saw tooth pulses of curve D which are applied to each one of threshold detectors #1–#32.

Returning to FIGURE 2, the negative sloping pulses of curve D are applied through diode 106 to the junction between condensers 81 and 82 in order to slowly decrease (as compared to an instantaneous decrease) the potential on the cathodes of diodes 78 and 75. It will be remembered that diodes 78 and 75 are normally nonconductive because of the voltage developed across resistors 68 and 72, the anodes of the two diodes being negative with respect to their respective cathodes. Assume now that the control potential from control signal source #3 is of positive polarity and has a predetermined amplitude level. Since the potential appearing on the anodes of normally cut off diodes 78 and 75 is dependent on the control potential from control signal source #3 neither one of the diodes will conduct in response to the decreasing negative potential of a D pulse unless the control potential is of sufficient magnitude that it results in the establishment of a positive potential on the anode of one of the diodes with respect to the potential impressed on its cathode by a pulse of curve D. Of course, if during the interval of a D pulse the cathode of neither diode 78 or 75 is sufficiently negative with respect to its associated anode, neither diode will conduct. The sloping leading edges of the pulses of curve D effectively provide a "sliding threshold." The circuit parameters of each threshold detector are adjusted so that the detector fires (namely, one of its two diodes conducts) only if the D.C. component or control potential represents more than negligible ping distortion. Of those that do fire, the sliding threshold causes the detector supplied with the least magnitude control potential to fire last.

To elucidate, when the potential impressed on grid 85 is positive, for example, the potential applied to cathode 65 will likewise be positive and thus tube 62 will have a greater flow of electrons than tube 63. The potential of anode 71 and thus that at the junction between resistors 72 and 73 will then be positive with respect to anode 67, and by the same token the potential at the junction between resistors 68 and 69 will be negative with respect to anode 71. Diode 78 is thus effectively biased to a further extent than is diode 75. However, assuming that the control potential represents more than negligible ping distortion, in response to a pulse of curve D the cathode of diode 75 reaches a potential level such that the diode conducts over the following path: condenser 81, diode 75, condenser 84, and resistor 93 to ground. This produces a negative pulse for application to grid 86. The point along the slope of the saw tooth D pulse at which one of the diodes conducts is determined by the particular magnitude of the control potential from control signal source #3.

If the control potential had been negative, diode 75 would be biased to a greater extent than diode 78 and thus diode 78 would conduct, over the following circuit: condenser 82, diode 78, condenser 83, and resistor 93 to ground. Thus, a negative pulse is produced across resistor 93 whether the control potential is positive or negative. It will be seen later, when past history is considered, that the polarity of the applied control potential has a very definite effect on the operation of each threshold detector.

The pulse amplifier comprising triode 87 is normally biased to saturation by the voltage dividing action of resistors 92 and 93, as mentioned before, but the negative pulse developed across resistor 93 is sufficient to cut the pulse amplifier off and thus to develop a sharply defined positive pulse at anode 94 of tube 87. This pulse is then applied to grid 97 of triode 98 which is biased normally beyond cut-off by means of negative bias potential source 102. A negative pulse is thus developed at anode 103 and is combined with the concurrently occurring negative saw tooth pulse of curve D in order to increase the current flow through the particular conducting diode (either 75 or 78), and thus to increase the magnitude of the negative pulse developed across resistor 93. This is merely well known regenerative action which results in the production of a sharply defined pulse the instant one of diodes 75, 78 conducts or fires. Each threshold detector may be designed so that the negative pulse developed at anode 103 is approximately twice the maximum amplitude of each saw tooth pulse of curve D.

The time constant of the coupling circuitry to triode 87 is adjusted to produce a pulse at cathode 100, once either diode 75 or 78 conducts, which is approximately three line-trace intervals in duration. Wave form E (FIGURE 4) illustrates the duration and timing of typical pulses developed at cathode 100 of tube 98. During field-retrace interval A it has been assumed for illustrative purposes that the threshold detector shown in FIGURE 2 fires approximately mid-way on the slope of the D pulse occurring during that field-retrace interval. In field-retrace interval B, it has been assumed that the threshold detector fired at the very beginning of the saw tooth, and in field-retrace interval C it has been assumed that the detector fired at approximately the termination of the pulse of curve D occurring during that field-retrace interval. The arrows in curve E illustrate the manner in which the pulses may be shifted in time, the leading edge of each pulse indicating the exact instant that the threshold detector fired.

Of course, pulses like that shown in curve E are developed at the outputs of only those threshold detectors provided with a control potential representing a D.C. component which is above a predetermined minimum or threshold, the parameters of each detector being so adjusted as mentioned previously. Consequently, for any given portion of audio information, it is possible that all of the operating states or phase conditions will render a ping which is above the threshold and thus all of the detectors will fire. This indicates that no matter which operating state is selected, there will be ping distortion above the permissible limit. However, since the threshold detector representing the operating state rendering the greatest ping fires early in the slope of the particular one of the D saw tooth pulses, as in field-retrace interval B, and since the threshold detector representing the operating state which will render the least ping, even if it is above the minimum, fires towards the end of the saw tooth pulse, as in field-retrace interval C, it is possible to select the operating state resulting in the least D.C. This will be explained shortly.

As mentioned before, threshold detector #3 along with the other threshold detectors quite often, and in fact usually, do not determine which coded audio signal has a D.C. component of least amplitude, but rather selects the coded audio having a D.C. component closest to a predetermined reference magnitude but of opposite polarity with respect to it because of the past history charge present in each receiver. It will be appreciated, as also mentioned before, that while the coded audio is coded in accordance with the operating state which will result in negligible or least ping distortion, there may still be a D.C. component in the transmitted coded audio signal of some magnitude and of either positive or negative polarity, even though the objective is to have no D.C. whatever. If that D.C. component is successfully transmitted to all of the receivers, the various coupling networks in the receivers will charge up to its potential level. Since the condensers in the coupling networks are not discharged in the receivers after each field-trace interval, the charge remains. Consequently, it is desirable in making the determination by the threshold detectors to take into account or consideration the past history of the system, namely the charge to which the receiver coupling networks assumed in response to the immediately previous determination.

Assume for the moment that the threshold detectors like that shown in FIGURE 2 are actuated in response to the D pulse occurring during field-retrace interval C in order effectively to measure or examine the D.C. component of the coded audio for the preceding field-trace interval B. In order to consider the effect of past history, a potential must be provided which represents the D.C. component of the coded audio signal during the next preceding field-trace interval, namely field-trace interval A. Such a voltage is produced in source 90, in a manner fully explained in Patent 3,073,893, and is applied to grid 89 of tube 63 and to the grids of similar triodes in all of the other threshold detectors in order to provide a reference potential of a predetermined magnitude but of opposite polarity, for reasons which will become apparent.

To illustrate, assume that the past history D.C. component is positive two volts and assume further that the potential applied to grid 85 of one of the threshold detectors is a positive one volt and to another is minus two volts. The past history reference potential is applied to grid 89 of each of the two threshold detectors under consideration as a negative two volts and because of the push-pull coupling arrangement this negative two volts is subjected to a polarity reversal at each cathode 64 and is effectively subtracted in the threshold detector to which is applied negative two volts on grid 85 so that the potential between grid 85 and cathode 64 is reduced to zero; consequently, the threshold detector will not fire during the occurrence of the concurrently applied saw tooth pulse indicating that the assigned operating state will result in negligible ping. On the other hand, the past history voltage of positive two volts will not cancel the control potential in the threshold detector to which a positive one volt is applied to its grid 85 and thus there will be a net potential of a negative one volt on grid 85 and that threshold detector will fire, assuming that a D.C. component of one volt is above the permissible limit and thus objectionable.

Thus, an operating state will be selected which will provide a D.C. component of a negative two volts rather than a positive one volt because when the audio, coded in accordance with that selected operating state, is combined with the charge already present in the receivers, the charge on the receiver coupling networks will be reduced to zero. In short, threshold detectors #1–#32 effectively compare the reference potential (positive two volts) with each of the control potentials and determines which one has a magnitude closest to the reference magnitude of two volts but has a polarity opposite to that of the reference potential.

Neglecting for the moment the effect of coincidence detector 110, the pulses developed at the outputs of the threshold detectors that have fired during any given field-retrace interval are supplied through the associated ones of delay lines #1–#32 and normally-open gates #1–#32 to the inputs of the assigned ones of binaries #1–#32 to trigger them from their normally reset conditions to their respective offset conditions. The manner in which binaries #1–#32 are conditioned to their reset conditions before the application of pulses from the threshold detectors is described in Patent 3,073,893. Assume, for example, that during a given field-trace interval the audio signal, when coded in accordance with operating states 3, 10, 14, 17, 21, 29 or 30, results in coded audio having a D.C. component below the lowest permissible threshold limit. Consequently, threshold detectors #3, #10, #14, #17, #21, #29 and #30 will not fire, whereas all the others will, resulting in the offsetting of all of binaries #1–#32 with the exception of #3, #10, #14, #17, #21, #29 and #30.

Circuitry, illustrated and described in Patent 3,073,893, is coupled to the output of binaries #1–#32 to randomly select one of operating states 3, 10, 14 ,17, 21, 29 and 30 and to produce a coded signal, in the form of a combination of code signal bursts of different frequencies, which is used in both the transmitter and the subscriber receivers to respectively code and decode the audio in accordance with the selected operating state.

Inasmuch as a determination or computation is made one each field-retrace interval, based on the level of D.C. in each of the thirty-two differently coded audio signals for the preceding field-trace interval, it is desirable to discharge all of the storage condensers in the integrators included in control signal sources #1–#32 immediately subsequent to each determination so that the condensers will have no residual charge, and thus may charge up to the D.C. levels of the applied coded audio signals during the succeeding field-trace interval preparatory to the next determination one complete field trace later. As disclosed in Patent 3,073,893, each of control signal sources #1–#32 includes a discharge circuit, which is actuated immediately subsequent to the termination of the sloping portion of each sawtooth pulse of curve D, to accomplish the function of discharging the storage condensers.

As mentioned before, it is possible that many of the thirty-two operating states will result in a ping that is sufficiently negligible to have no perceptible effect, in which case, of course, the associated threshold detectors will not fire. On the other hand, there may be times when all thirty-two operating states result in a ping above the threshold or permissible limit. Consequently, it is advantageous to select an operating state resulting in the lowest possible D.C. level, even if it may still be outside the acceptable threshold limit.

To that end, coincidence detector 110 is provided to effectively determine which one, when all the detectors fire during the sloping portion of a D pulse, fires last. Consideration now will be given to the detailed representation of this coincidence detector in FIGURE 3 along with the partial representations of the threshold detectors included in that figure. If at least one of the threshold detectors does not fire during the occurrence of a pulse of curve D, indicating that the operating state to which that threshold detector is assigned will result in a ping within the minimum threshold limit, coincidence detector 110 has no effect whatsoever and is not required. In that case, resistor 113 in the coincidence detector is shunted by the cathode resistor 101 of the unfired threshold detector, diodes #1–#32 being normally conductive due to the positive potential at the junction between resistors 112 and 113. The parameters of the coincidence detector are so designed that when resistor 113 is shunted by at least one of the thirty-two resistors 101, the positive voltage at the junction between resistors 112 and 113 is not sufficient to render two-stage pulse amplifier 114 conductive as it is provided with a fixed bias to maintain it normally cut off.

However, if all of the threshold detectors fire, which means that all of the operating states result in ping above the minimum threshold limit, all of diodes #1–#32 will be cut off (since there will be a positive potential at each of the cathodes 100) and resistor 113 no longer will be shunted. This changes the voltage dividing arrangement between resistors 112 and 113, causing the potential at the junction between these two resistors to rise sufficiently to render two-stage pulse amplifier 114 conductive and thus to produce a positive pulse at its output.

Figure 5:
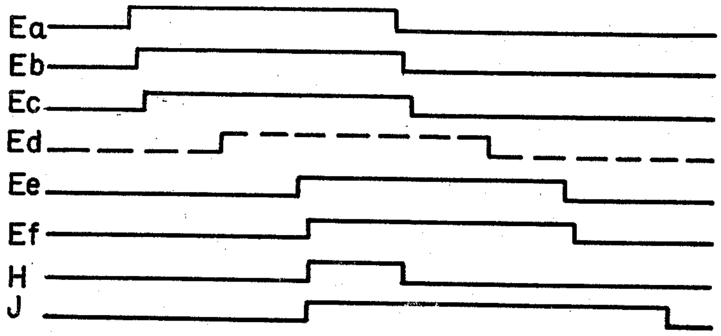

Thus, coincidence detector 110 effectively produces a positive pulse when all of the threshold detectors fire but in addition to that it also effectively determines in a manner to be described which threshold detector fired last, indicating which operating state results in least ping even though it is above the desired limit. This may be explained with the help of the wave forms shown in FIGURE 5. For convenience, assume that all of the threshold detectors #1–#32 fire in the same sequence as their numbers and thus the pulse of curve $E_a$ (corresponding to a pulse of curve E except on a considerably extended time scale) is developed at the cathode 100 of the corresponding tube 98 in threshold detector #1 for application to the cathode of diode #1. Since threshold detectors #2–#32 fire in rapid succession, wave forms $E_b$–$E_f$ appear at their corresponding outputs. Of course, wave form $E_d$ is shown in dashed construction to illustrate collectively all of the other output wave forms of threshold detectors #4–#30. Each time a threshold detector fires it cuts off its assigned one of diodes #1–#32 but until the instant of firing of threshold detector #32, diode #32 is still conducting and thus providing resistor 113 with a shunt circuit. However, at the moment that threshold detector #32 triggers, diode #32 is rendered non-conductive, removing the last shunt across resistor 113, and a positive pulse as represented in curve H is applied to amplifier 114, the output of the amplifier being applied to mono-stable multivibrator 116 to provide the pulse of curve J. It will be noted that the trailing edge of the pulse of curve H occurs at the trailing edge of the pulse of the first detector fired, namely the pulse of wave form $E_a$, since upon the termination of the $E_a$ pulse diode #1 returns to its normally conductive state. The parameters of multivibrator 116 are so chosen that once it is triggered to its abnormal operating condition it will remain there for a time duration equal to approximately four line-trace intervals.

The pulse of curve J closes each one of gates #1–#32 (returning to FIGURE 1) in order to prevent the translation of a pulse from the last threshold detector fired, namely #32 in the illustrative example, to its associated binary #32. Of course, the gating pulse of curve J will have no effect on gates #1–#31 because signals from their associated threshold detectors have already been translated to their associated ones of binaries #1–#32. However, because of the slight delay, approximately one-sixteenth of a line-trace interval, introduced by delay line #32, the pulse of curve J will effectively prevent the translation of the pulse of wave form $E_f$, after it has been delayed, to binary #32. Consequently, binary #32 will not be triggered from its reset to its offset condition and this represents that operating state 32 results in the least objectionable ping. The circuitry, described in Patent 3,073,893 and coupled to the output of binaries #1–#32, will produce a combination of code signal bursts which will establish the transmitter and receivers in operating state 32.

If desired, the operating state resulting in least ping may always be selected. The threshold limit may effectively be reduced to zero by making the amplitude of the D pulses sufficient high that all threshold detectors fire. In this way, the coincidence detector will select the least ping operating state.

To summarize the inventive detecting apparatus to which the present application is directed, control signal sources #1–#32 collectively constitute means for simultaneously developing several different control effects (specifically, control potentials) each of which has a unique, unknown amplitude. The threshold detectors and coincidence detector 110 may be considered means coupled to the developing means for selecting the one of the different control effects having an amplitude closest to a predetermined reference magnitude. More particularly, this selecting means effectively compares the amplitude of each of the control effects from the control signal sources with a predetermined reference magnitude (past history from reference signal source 90) to determine the one having a magnitude closest to the reference magnitude but of opposite polarity with respect thereto. The detecting apparatus of the present invention also includes means (gate circuits #1–#32, delay lines #1–#32, and binaries #1–#32) coupled to the selecting means for providing information indicating the selected control effect. Specifically, the selected control effect is effectively registered and stored in one of binaries #1–#32.

Viewed differently, the detecting apparatus of the present invention includes a series of threshold detectors to each of which is applied an assigned, respective one of the control effects from the discharge circuits and each of which is actuable from one operating condition to another if and when the applied control effect exceeds a predetermined threshold level or limit. Triangular wave generator 109 constitutes means for linearly varying (specifically decreasing) the threshold of the detectors to effect firing thereof in an order or sequence dictated by the particular relative amplitudes of the control effects, the last threshold detector firing indicating the control effect exhibiting an amplitude closest to a predetermined reference magnitude. Specifically, it indicates the control effect having the least amplitude when past history is zero or ignored. Taking past history into account, each threshold detector fires when the algebraic sum of the applied control potential and reference potential exceeds the threshold level. In this case, the last threshold detector that fires indicates the control signal having an amplitude closest to that of the reference past history signal but of opposite polarity with respect to it. Coincidence detector 110, gate circuits #1–#32, delay lines #1–#32, and binaries #1–#32 may be considered means coupled to threshold detectors #1–#32 for providing information indicating the selected control effect.

Viewed from a still different aspect, the detecting apparatus of the present invention includes an actuating mechanism (coincidence detector 110) having an input circuit shunted by a series of normally-conductive shunt circuits, each of which includes an assigned one of normally-conductive unidirectional translating devices or diodes #1–#32. Actuating mechanism 110 has a plurality of operating conditions and, responsive to the application of an input signal of an amplitude exceeding a predetermined triggering level, is operable from one condition to another. Specifically, pulse amplifier 114 in coincidence detector 110 is normally biased to cut-off and is not rendered conductive until the voltage across resistor 113 exceeds a predetermined triggering level. The threshold detectors and the circuitry coupled thereto constitute means for utilizing the different control effects from discharge circuits #1–#32 to render assigned, respective ones of the shunt circuits non-conductive in a sequence or order determined by the particular relative amplitudes of the control effects. When the last shunt circuit is rendered non-conductive the voltage developed across resistor 113 increases to exceed the triggering level and this triggers the actuating mechanism from its cut-off to its conducting condition in order to indicate the control effect having an amplitude closest to the reference magnitude.

Certain features described in the present application are disclosed and claimed in copending application Serial No. 829,105, now U.S. Patent No. 3,138,763, filed concurrently herewith in the name of Melvin C. Hendrickson, and assigned to the present assignee.

While a particular embodiment of the invention has been shown and described, modifications may be made, and it is intended in the appended claims to cover all such modifications as may fall within the true spirit and scope of the invention.

We claim:

1. Detecting apparatus comprising: means for simultaneously developing several different control signals each of which has a unique, unknown, amplitude-polarity condition; a source of a reference signal of either polarity and having a fixed amplitude; means coupled to said developing means and to said reference signal source for selecting the one of said different control signals having an amplitude closest to that of said reference signal but of opposite polarity with respect thereto; and means coupled to said selecting means for providing information representing the selected control signal.

2. Detecting apparatus comprising: means for simultaneously developing several different control signals each of which has a unique, unknown amplitude-polarity condition; a source of a reference signal of either polarity and having a fixed amplitude; means coupled to said developing means and to said reference signal source for effectively comparing the amplitude and polarity of each of said control signals with said reference signal to determine the one having an amplitude closest to that of said reference signal but of opposite polarity with respect thereto; and means coupled to said comparing means for providing information representing said last-mentioned control signal.

3. Detecting apparatus comprising: means for simultaneously developing several different control signals each of which has a unique, unknown amplitude-polarity condition; a source of a reference signal of either polarity and having a fixed amplitude; a series of threshold detector means coupled to said developing means and to said reference signal source and to each of which is applied an assigned, respective one of said control signals and each of which is actuable from one operating condition to another if and when the applied control signal exceeds a predetermined threshold level; means for varying the threshold of said threshold detector means to effect firing thereof in an order dictated by the particular relative amplitudes of said control signals compared to said reference signal; and means coupled to said threshold detector means for providing information representing the control signal exhibiting an amplitude closest to that of said reference signal but of opposite polarity with respect thereto.

4. Detecting apparatus comprising: means for simultaneously developing several different control signals each of which has a unique, unknown amplitude-polarity condition; a source of a reference signal of either polarity and having a fixed amplitude; a series of threshold detector means coupled to said developing means and to said reference signal source and to each of which is applied an assigned, respective one of said control signals and each of which is actuable from one operating condition to another if and when the applied control signal exceeds a predetermined threshold level; means for decreasing the threshold of said threshold detector means to effect firing thereof in an order dictated by the particular relative amplitudes of said control signals compared to said reference signal, the last threshold detector means firing indicating the control signal having an amplitude closest to that of said reference signal but of opposite polarity with respect thereto; and means coupled to said threshold detector means for providing information representing said last-mentioned control signal.

5. Detecting apparatus comprising: means for simultaneously developing several different control signals each of which has a unique, unknown amplitude-polarity condition; a source of a reference signal of either polarity and having a fixed amplitude; a series of threshold detector means coupled to said developing means and to said source and to each of which is applied said reference signal and also an assigned, respective one of said control signals and each of which is actuable from one operating condition to another if and when the algebraic sum of the applied signals exceeds a predetermined threshold level; means for linearly decreasing the threshold of said threshold detector means to effect firing thereof in an order dictated by the particular relative amplitudes of said control signals compared to said reference signal, the last threshold detector means firing indicating the control signal having an amplitude closest to that of said reference signal but of opposite polarity with respect thereto; and means coupled to said threshold detector means for providing information representing said last-mentioned control signal.

6. Detecting apparatus comprising: means for simultaneously developing several different control signals each of which has a unique, unknown amplitude and polarity; a source of a reference signal of either polarity and having a fixed amplitude; an actuating means having a plurality of operating conditions and, responsive to the application of an input signal of an amplitude exceeding a predetermined triggering level, operable from one condition to another; means coupled to said developing means and to said reference signal source for selecting the one of said different control signals having an amplitude closest to that of said reference signal but of opposite polarity with respect thereto means coupled to said selecting means and responsive to the selected control signal for applying an input signal to said actuating means of an amplitude sufficient to trigger said actuating means to said other condition; and means coupled to said actuating means for providing information representing the selected control signal.

7. Detecting apparatus comprising: means for simultaneously developing several different control signals each of which has a unique, unknown amplitude; a source of a reference signal having a fixed amplitude; an actuating means having an input circuit shunted by a series of normally-conductive shunt circuits; means coupled to said developing means and to said reference signal source and responsive to said different control signals for rendering assigned, respective ones of said shunt circuits non-conductive in a sequence determined by the particular relative amplitudes of said control signals, said actuating means triggering from one condition to another responsive to the rendering of the last shunt circuit non-conductive to indicate the control signal having an amplitude closest to that of said reference signal; and means coupled to said actuating means for providing information representing said last-mentioned control signal.

8. Detecting apparatus comprising: means for simultaneously developing several different control signals each of which has a unique, unknown amplitude; an actuating means having a plurality of operating conditions and having an input circuit shunted by a series of shunt circuits each of which includes a normally-conductive unidirectional translating device, said actuating means being operable from one condition to another responsive to an applied input signal of an amplitude exceeding a predetermined triggering level; means coupled to said developing means and responsive to said different control signals for rendering assigned, respective ones of said unidirectional translating devices non-conductive to open said shunt circuits one at a time in a sequence determined by the particular relative amplitudes of said control signals, said actuating means receiving an input signal of an amplitude sufficient to effect triggering thereof to said other condition when the last of said shunt circuits is opened to indicate the control signal having an amplitude closest to a predetermined reference magnitude; and means coupled to said actuating means for providing information representing said last-mentioned control signal.

(References on following page)

References Cited by the Examiner

UNITED STATES PATENTS

| | | | |
|---|---|---|---|
| 2,413,440 | 12/46 | Farrington | 340—172 |
| 2,611,813 | 9/52 | Sharpless | 340—172.5 |
| 2,679,636 | 5/54 | Hillyer | 340—149 |
| 2,725,549 | 11/55 | Dunnett | 340—172 |
| 2,735,082 | 2/56 | Goldberg | 340—172.5 |
| 2,787,418 | 4/57 | MacKnight et al. | 340—347 |
| 2,815,448 | 12/57 | Filipowsky | 340—172 |
| 2,815,500 | 12/57 | Hance et al. | 340—149 |
| 2,821,696 | 1/58 | Shiowitz et al. | 340—149 |
| 2,837,740 | 6/58 | Riddle | 307—88.58 |
| 2,843,839 | 7/58 | Cunningham | 340—149 X |
| 2,924,812 | 2/60 | Merritt et al. | 340—146.3 |
| 2,972,126 | 2/61 | Hecox et al. | 340—172 |

NEIL C. READ, *Primary Examiner.*

EVERETT R. REYNOLDS, IRVING L. SRAGOW, *Examiners.*